(12) United States Patent
Ohira et al.

(10) Patent No.: US 8,609,280 B2
(45) Date of Patent: Dec. 17, 2013

(54) POSITIVE ELECTRODE ACTIVE SUBSTANCE CONTAINING LITHIUM-CONTAINING METAL OXIDE, POSITIVE ELECTRODE, AND NON-AQUEOUS ELECTROLYTE SECONDARY BATTERY

(75) Inventors: Koji Ohira, Osaka (JP); Motoaki Nishijima, Osaka (JP); Toshitsugu Sueki, Osaka (JP); Shougo Esaki, Osaka (JP); Isao Tanaka, Kyoto (JP); Yukinori Koyama, Kyoto (JP); Katsuhisa Tanaka, Kyoto (JP); Koji Fujita, Kyoto (JP); Shunsuke Murai, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 222 days.

(21) Appl. No.: 13/175,300

(22) Filed: Jul. 1, 2011

(65) Prior Publication Data
US 2012/0003537 A1 Jan. 5, 2012

(30) Foreign Application Priority Data

Jul. 1, 2010 (JP) ................... 2010-151202

(51) Int. Cl.
*H01M 4/58* (2010.01)
*H01M 4/00* (2006.01)

(52) U.S. Cl.
USPC ................... 429/218.1; 429/231.95; 429/221; 252/182.1

(58) Field of Classification Search
USPC ...................... 429/218.1, 231.95, 231.9, 221; 252/182.1, 520.21, 520.22, 521.2, 252/521.3, 521.6
See application file for complete search history.

(56) References Cited

U.S. PATENT DOCUMENTS 6,815,122 B2 * 11/2004 Barker et al. ............. 429/231.9

FOREIGN PATENT DOCUMENTS

| JP | 2005-519451 | 6/2005 | |
|----|----|----|----|
| JP | 2005-522009 | 7/2005 | |
| JP | 2008-506243 | 2/2008 | |
| JP | 2009-104794 | 5/2009 | |
| JP | 2010-123341 | * 6/2010 | ............. H01M 4/58 |

* cited by examiner

*Primary Examiner* — Raymond Alejandro
(74) *Attorney, Agent, or Firm* — Nixon & Vanderhye P.C.

(57) ABSTRACT

A positive electrode active substance comprising a lithium-containing metal oxide
represented by the following general formula (1):

$$LiFe_{1-x}M_xP_{1-y}Si_yO_4 \qquad (1)$$

wherein M represents an element selected from group III to group XIV; $0<x<1$; and $0<y<1$,
having a volume of a unit lattice of 291.4 to 300.0 Å³ or 285.0 to 291.0 Å³, and
having a half value width of a diffraction peak of a (011) surface of 0.30° or more.

9 Claims, 1 Drawing Sheet

POSITIVE ELECTRODE ACTIVE SUBSTANCE CONTAINING LITHIUM-CONTAINING METAL OXIDE, POSITIVE ELECTRODE, AND NON-AQUEOUS ELECTROLYTE SECONDARY BATTERY

CROSS-REFERENCE TO RELATED APPLICATION

This application is related to Japanese application No. 2010-151202 filed on Jul. 1, 2010, whose priority is claimed under 35 USC §119, the disclosure of which is incorporated by reference in its entirety.

BACKGROUND OF THE INVENTION

1. Field of the Invention

The present invention relates to a positive electrode active substance, a positive electrode, and a non-aqueous electrolyte secondary battery. More particularly, the present invention relates to a positive electrode active substance that gives a non-aqueous electrolyte secondary battery excellent in cycle characteristics as well as to a positive electrode and a non-aqueous electrolyte secondary battery using the same.

2. Description of the Related Art

As a non-aqueous electrolyte secondary battery, a lithium secondary battery is put into practical use and is widely prevalent. Further, in recent years, a lithium secondary battery is attracting people's attention not only as a small one for a portable electronic apparatus but also as a large-capacity device for being mounted on a vehicle or for electric power storage. For this reason, there is an enhanced demand for safety, cost reduction, long lifetime, and the like.

The lithium secondary battery has a positive electrode, a negative electrode, an electrolytic solution, a separator, and an outer cladding material as principal constituent elements. Also, the above positive electrode is constituted of a positive electrode active substance, an electroconductive material, a collector, and a binder (binding agent).

Generally, as the positive electrode active substance, a layered transition metal oxide such as represented by $LiCoO_2$ is used. However, the layered transition metal oxide is liable to provoke oxygen elimination in a fully charged state at a comparatively low temperature around 150° C., and this oxygen elimination can provoke thermal bursting reaction of the battery. Therefore, when the battery having such the positive electrode active substance is used in the portable electronic apparatus, there is a fear that an accident such as heat generation and fire catching of the battery may occur.

For this reason, lithium iron phosphate ($LiFePO_4$) having a stable structure that does not release oxygen at an abnormal time and having an olivine structure less expensive than $LiCoO_2$ is now expected.

It is known that $LiFePO_4$ has a volume change ratio (See the following formula) as large as about 7% between at the time of Li intercalation and at the time of Li deintercalation, and generates capacity deterioration by repetition of charging and discharging cycles. The reason why the capacity deterioration is generated is as follows. Namely, volume change caused by repetition of charging and discharging cycles provokes destruction of a particulate positive electrode active substance made of $LiFePO_4$, disconnection of the electroconductive path, and the like. By destruction, disconnection, and the like, a rise in an internal resistance within the positive electrode and inactive parts are generated, thereby causing capacity deterioration (decrease).

volume change ratio=$(A-B)\times 100/A$ where A is a unit lattice volume before lithium deintercalation and B is a unit lattice volume after lithium deintercalation.

Also, it is known that, at a high temperature, a reaction product produced at the interface between the non-aqueous electrolyte and the positive electrode deteriorates the capacitance.

Various methods of solving the aforementioned capacity deterioration are proposed.

For example, Japanese Patent Application Publication No. 2005-340056 attempts to restrain capacity deterioration by putting $Al_2O_3$ that does not contribute to charging and discharging into the positive electrode.

Also, Japanese Patent Application Publication No. 2008-166207 attempts to restrain capacity deterioration by putting an inorganic substance that does not contribute to charging and discharging into the positive electrode so as to raise the dispersibility of the positive electrode active substance.

SUMMARY OF THE INVENTION

According to the present invention, there is provided a positive electrode active substance comprising a lithium-containing metal oxide represented by the following general formula (1):

$$LiFe_{1-x}M_xP_{1-y}Si_yO_4 \quad (1)$$

wherein M represents an element selected from group III to group XIV; $0<x<1$; and $0<y<1$,
having a volume of a unit lattice of 291.4 to 300.0 Å³ or 285.0 to 291.0 Å³, and
having a half value width of a diffraction peak of a (011) surface of 0.30° or more.

Also, according to the present invention, there is provided a positive electrode comprising the aforesaid positive electrode active substance, an electroconductive material, and a binder.

Further, according to the present invention, there is provided a non-aqueous electrolyte secondary battery comprising a positive electrode containing the aforesaid positive electrode active substance, a negative electrode, an electrolyte, and a separator.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
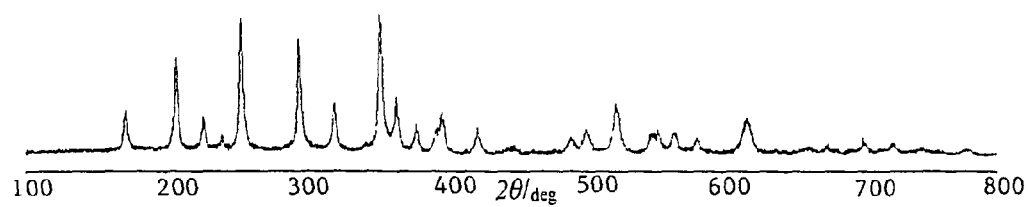
FIG. 1 is a powder X-ray diffraction pattern of the positive electrode active substance of the example 1.

However, none of the positive electrode active substances disclosed in the above patent documents could sufficiently restrain the capacity deterioration.

As a result of studies, the present inventors have found out that a positive electrode active substance with restrained volume change ratio can be obtained by
(1) substituting a part of a P site of LiFePO$_4$ with Si and substituting a part of an Fe site with other elements, and
(2) setting the half value width of the diffraction peak of the (011) surface to be 0.30° or more,
and a battery using this positive electrode active substance can restrain the capacity deterioration caused by charging and discharging, thereby completing the present invention.

Hereafter, the present invention will be described in more detail.

(I) (a) Positive Electrode Active Substance

The positive electrode active substance is a lithium-containing metal oxide having a unit lattice represented by the following general formula (1):

$$LiFe_{1-x}M_xP_{1-y}Si_yO_4 \qquad (1)$$

where, in the formula, M represents an element selected from group III to group XIV; 0<x<1; and 0<y<1.

The present inventors have unexpectedly found out:
(i) that the volume change generated by intercalation and deintercalation of lithium can be restrained, that is, the volume change ratio (method of measurement is described in the Examples) can be reduced, by substituting a part of P constituting LiFePO$_4$ with Si and substituting a part of Fe with other elements,
(ii) that the volume change generated by intercalation and deintercalation of lithium can be restrained, that is, the volume change ratio can be reduced, by setting the half value width of the diffraction peak of the (011) surface in the positive electrode active substance in the general formula (1) to be 0.30° or more, and
(iii) that the volume change generated by intercalation and deintercalation of lithium can be restrained, that is, the volume change ratio can be reduced, by setting the volume of the unit lattice to be 291.4 to 300.0 Å$^3$ or 285.0 to 291.0 Å$^3$.

For this reason, regarding the lithium-containing metal oxide of the above general formula (1), expansion and contraction by charging and discharging is restrained. When an element substitution is carried out using LiFePO$_4$ as a base, a substance having a volume of the unit lattice larger than 300.0 Å$^3$ or smaller than 285.0 Å$^3$ cannot be obtained. Here, the volume can assume values of 286.0 Å$^3$, 287.0 Å$^3$, 288.0 Å$^3$, 289.0 Å$^3$, 290.0 Å$^3$, 292.0 Å$^3$, 293.0 Å$^3$, 294.0 Å$^3$, 295.0 Å$^3$, 296.0 Å$^3$, 297.0 Å$^3$, 298.0 Å$^3$, and 299.0 Å$^3$.

The volume of the unit lattice tends to be dependent on the kind of the substituted element M and the Si amount. For example, when M is Zr, the volume increases according as the Si amount increases. Specifically, according as the Si amount increases, the volume increases from 291.4 Å$^3$ to 294.5 Å$^3$. Also, when M is Al, the volume decreases according as the Si amount increases. Specifically, according as the Si amount increases, the volume decreases from 291.4 Å$^3$ to 291 Å$^3$ or less. A more preferable volume is 291.4 to 295.0 Å$^3$ or 289.0 to 291.0 Å$^3$. In view of obtaining characteristics as a battery, it is preferable that the amount of an element substituting the Fe site is 25% or less, and the volume of the unit lattice of such a substance is 295.0 Å$^3$ or less or 289.0 Å$^3$ or more.

Almost all of the lithium-containing metal oxide having a composition of the general formula (1) has an olivine structure; however, it may have a construction that does not have an olivine structure.

In the general formula (1), M is an element selected from the elements belonging to group III to group XIV (excluding Fe). For example, M can be selected from the elements belonging to group III (for example, Se, Y, La), group IV (for example, Ti, Zr, Hf), group XIII (for example, B, Al, Ga, In, Tl), and group XIV (for example, C, Si, Ge, Sn, Pb). Further, M can be selected from the elements belonging to the third to fifth period. Among these, M is preferably selected from Sn, Zr, Y, and Al. Specifically, in addition to a case in which one element is selected from Sn, Zr, Y, and Al, there are a case in which two elements are selected as (Sn and Zr), (Sn and Y), (Sn and Al), (Zr and Y), (Zr and Al), or (Y and Al), a case in which three elements are selected as (Sn, Zr, and Y), (Sn, Zr, and Al), (Sn, Y, and Al), or (Zr, Y, and Al), and a case in which four elements of Sn, Zr, Y, and Al are selected.

Also, the valence number of M is not particularly limited. Specifically, Y and Al are trivalent; Sn can be divalent or tetravalent; and Zr can be divalent, trivalent, or tetravalent. Regarding Sn and Zr, a metal element of a single valence number can be used, or alternatively a mixture of metal elements of plural valence numbers can be used. Among these valence numbers, regarding Sn and Zr, it is preferable to use a tetravalent one from the viewpoint that a change in the valence number is small at the time of producing the lithium-containing metal oxide and at the time of charging and discharging. Since Y and Al are always trivalent, the change in the valence number can be reduced at the time of producing the lithium-containing metal oxide and at the time of charging and discharging, by using these.

Also, Fe can be divalent, trivalent, tetravalent, or hexavalent. Regarding Fe, a metal element of a single valence number can be used, or alternatively a mixture of metal elements of plural valence numbers can be used. Regarding Fe, it is preferable to use a divalent one in view of improving the intercalation and deintercalation properties of Li. Here, when a mixture is used, the valence number for defining x in the general formula (1) is assumed to mean an average value for convenience's sake.

From the viewpoint that the effect of restraining the volume change ratio is large, M is preferably a trivalent or tetravalent metal element, and is more preferably tetravalent Zr.

In the general formula (1), x can assume a value in a range of 0<x<1, and y can assume a value in a range of 0<y<1. In view of further reducing the volume change ratio of the lithium-containing metal oxide, it is preferable that x is in a range of 0<x≤0.2 and/or y is in a range of 0<y≤0.4, and it is more preferable that x is in a range of 0.05≤x≤0.125 and/or y is in a range of 0.05≤y≤0.25. For example, x can assume a value of 0.03, 0.06, 0.09, 0.12, 0.15, or 0.18, and y can assume a value of 0.05, 0.10, 0.15, 0.20, 0.25, 0.30, or 0.35.

More specifically, when the value of x is large (the amount of substitution with M in the Fe site is large) and/or the value of y is large, the volume change ratio will be small, and the discharging capacity tends to be small. Therefore, the values of x and y can be determined from the kind of selected M, a desired volume change ratio, and the discharging capacity.

Here, the lithium-containing metal oxide preferably has a volume change ratio of 5.5% or less. The reason therefor is that there are a lot of lithium-containing metal oxide such that, with 5.5% being a boundary, a gradient of the capacity maintaining ratio (a ratio of the capacity after charging and discharging cycles relative to an initial capacity) relative to the volume change ratio changes. Namely, when the volume change ratio becomes higher than about 5.5%, the degree of decrease in the capacity maintaining ratio relative to an increase in the volume change ratio may sometimes become large. Therefore, when the volume change ratio is 5.5% or less, the decrease in the capacity maintaining ratio can be further more restrained. The lower limit of the volume change ratio is 0%. For example, the volume change ratio can assume a value of 5.0% or less, 4.5% or less, 4.0% or less, 3.5% or less, 3.0% or less, 2.5% or less, 2.0% or less, 1.5% or less, 1.0% or less, or 0.5% or less.

In view of setting the volume change ratio to be 5.5% or less, it is particularly preferable that x is in a range of $0.05 \leq x \leq 0.2$ and/or y is in a range of $0.15 \leq x \leq 0.5$. In this range, the volume change generated at the time of intercalation and deintercalation of lithium can be restrained without greatly decreasing the discharging capacity.

Further, according as x is larger and/or y is larger, the volume change ratio can be restrained, whereby the capacity maintaining ratio can be improved. When the volume change ratio is 5.5% or less, the capacity maintaining ratio can be 90% or more.

Conversely, according as x is larger and/or y is larger, the initial capacity may sometimes decrease.

For example, when Fe is substituted with Zr, it is preferable that x is 0.35 or less and/or y is 0.7 or less in view of obtaining an initial capacity of 100 mAh/g or more; it is more preferable that x is 0.3 or less and/or y is 0.6 or less in view of obtaining an initial capacity of 110 mAh/g or more; and it is further more preferable that x is 0.25 or less and/or y is 0.5 or less in view of obtaining an initial capacity of 120 mAh/g or more.

When Fe is substituted with Sn, it is preferable that x is 0.3 or less and/or y is 0.6 or less in view of obtaining an initial capacity of 100 mAh/g or more; it is more preferable that x is 0.25 or less and/or y is 0.5 or less in view of obtaining an initial capacity of 110 mAh/g or more; and it is further more preferable that x is 0.2 or less and/or y is 0.4 or less in view of obtaining an initial capacity of 120 mAh/g or more.

When Fe is substituted with Y, it is preferable that x is 0.35 or less and/or y is 0.35 or less in view of obtaining an initial capacity of 100 mAh/g or more; it is more preferable that x is 0.3 or less and/or y is 0.3 or less in view of obtaining an initial capacity of 110 mAh/g or more; and it is further more preferable that x is 0.25 or less and/or y is 0.25 or less in view of obtaining an initial capacity of 120 mAh/g or more.

When Fe is substituted with Al, it is preferable that x is 0.45 or less and/or y is 0.45 or less in view of obtaining an initial capacity of 100 mAh/g or more; it is more preferable that x is 0.4 or less and/or y is 0.4 or less in view of obtaining an initial capacity of 110 mAh/g or more; and it is further more preferable that x is 0.3 or less and/or y is 0.3 or less in view of obtaining an initial capacity of 120 mAh/g or more.

When Fe is substituted with a trivalent metal atom and all of Fe is divalent, the amount of Si can be set to be equal to the amount of substitution of Fe in order to maintain an electric neutrality. In this case, in view of obtaining a volume change ratio of 4% or less, the substituted amount by Al is preferably 0.35 or more, and the substituted amount by Y is preferably 0.2 or more.

When Fe is substituted with a metal atom having a valence number of +4 and all of Fe has a valence number of +2, the amount of Si can be set to be double the amount of substitution of Fe in order to maintain an electric neutrality. In this case, in view of obtaining a volume change ratio of 4% or less, the substituted amount by Zr is preferably 0.15 or more, and the substituted amount by Sn is preferably 0.25 or more. Also, in view of obtaining a volume change ratio of 3% or less, the substituted amount by Zr is preferably 0.2 or more, and the substituted amount by Sn is preferably 0.3 or more. Further, in view of obtaining a volume change ratio of 2% or less, the substituted amount by Zr is preferably 0.25 or more.

More specific examples of the lithium-containing metal oxide include:

$LiFe_{1-x}Zr_xP_{1-y}Si_yO_4$ ($0.075 \leq x \leq 0.25$, $0.15 \leq y \leq 0.5$),
$LiFe_{1-x}Sn_xP_{1-y}Si_yO_4$ ($0.075 \leq x \leq 0.25$, $0.15 \leq y \leq 0.5$),
$LiFe_{1-x}Y_xP_{1-y}Si_yO_4$ ($0.0125 \leq x \leq 0.25$, $0.125 \leq y \leq 0.25$),
$LiFe_{1-x}Al_xP_{1-y}Si_yO_4$ ($0.0125 \leq x \leq 0.25$, $0.125 \leq y \leq 0.25$),
$LiFe_{1-x}(Zr, Sn)_xP_{1-y}Si_yO_4$ ($0.075 \leq x \leq 0.25$, $0.15 \leq y \leq 0.5$, atomic ratio of Zr and Sn is 1:1 to 100:1),
$LiFe_{1-x}(Zr, Y)_xP_{1-y}Si_yO_4$ ($0.075 \leq x \leq 0.25$, $0.15 \leq y \leq 0.5$, atomic ratio of Zr and Y is 1:1 to 100:1),
$LiFe_{1-x}(Zr, Al)_xP_{1-y}Si_yO_4$ ($0.075 \leq x \leq 0.25$, $0.15 \leq y \leq 0.5$, atomic ratio of Zr and Al is 1:1 to 100:1),
$LiFe_{1-x}(Sn, Y)_xP_{1-y}Si_yO_4$ ($0.075 \leq x \leq 0.25$, $0.075 \leq y \leq 0.5$, atomic ratio of Sn and Y is 1:100 to 100:1),
$LiFe_{1-x}(Sn, Al)_xP_{1-y}Si_yO_4$ ($0.075 \leq x \leq 0.25$, $0.075 \leq y \leq 0.5$, atomic ratio of Sn and Al is 1:100 to 100:1), and
$LiFe_{1-x}(Y, Al)_xP_{1-y}Si_yO_4$ ($0.075 \leq x \leq 0.25$, $0.075 \leq y \leq 0.25$, atomic ratio of Y and Al is 1:100 to 100:1).

Here, in the above formula, $0.075 \leq x \leq 0.25$ can assume a value of 0.10, 0.125, 0.15, 0.175, 0.20, or 0.225; $0.0125 \leq x \leq 0.25$ can assume a value of 0.0525, 0.0925, 0.1325, 0.1725, 0.2125, or 0.2425; $0.15 \leq y \leq 0.5$ can assume a value of 0.20, 0.25, 0.30, 0.35, 0.40, or 0.45; $0.0125 \leq y \leq 0.25$ can assume a value of 0.0525, 0.0925, 0.1325, 0.1725, 0.2125, or 0.2425; $0.075 \leq y \leq 0.25$ can assume a value of 0.10, 0.125, 0.15, 0.175, 0.20, or 0.225; the atomic ratio can assume a value of 1:20, 1:30, 1:40, 1:50, 1:60, 1:70, 1:80, or 1:90.

Also, x and y preferably satisfy a relationship of $2x=y$. A lithium-containing metal oxide having this relationship can carry out electric charge compensation in the positive electrode active substance with the substituted elements. As a result of this, effects of restraint of impurities and increase in the charging and discharging capacity are given to the battery.

Further, the lithium-containing metal oxide has a half value width of the diffraction peak of the (011) surface of 0.30° or more. By having this half value width, the volume change caused by intercalation and deintercalation of lithium can be restrained. A more preferable half value width range is 0.3° to 0.4°.

(b) Method of Producing the Positive Electrode Active Substance

The lithium-containing metal oxide can be produced by using a combination of carbonate, hydroxide, chloride, sulfate, acetate, oxide, oxalate, nitrate, and the like of each element as a source material. The source material may contain a hydrated water. As a production method, methods such as the firing method, the solid phase method, the sol-gel method, the melting-quenching method, the mechanochemical method, the cosedimentation method, the hydrothermal method, and the spray pyrolysis method can be used. Among these methods, the firing method in an inert atmosphere (for example, nitrogen atmosphere) (a firing condition is 1 to 24 hours at 400 to 650° C.) is convenient.

(c) Others

In order to improve the electric conductivity, a surface of the positive electrode active substance may be covered with carbon. The covering may extend either to the whole surface of the positive electrode active substance or to a part thereof.

A ratio of the covering carbon is preferably in a range of 0.5 to 10 parts by weight relative to 100 parts by weight of the positive electrode active substance. When the ratio is less than 0.5 part by weight, an effect of covering with carbon may not be sufficiently obtained. When the ratio is more than 10 parts by weight, the capacity of the battery may decrease. A more preferable ratio is in a range of 1 to 5 parts by weight.

A method of covering with carbon is not particularly limited, so that a known method can be used. For example, there is a method of covering by mixing a compound that will be a carbon source with a material of lithium-containing metal oxide and/or metal oxide and firing the obtained mixture in an inert atmosphere. As the compound that will be the carbon source, a compound that does not hinder the source material from changing to the lithium-containing metal oxide and/or metal oxide must be used. Examples of such a compound include sucrose, fructose, and the like with respect to sugars. Or else, the examples include polyethylene glycol, polypropylene glycol, and the like with respect to polyethers. Also, polymers containing carbon such as polyvinyl alcohol, polyacrylamide, carboxymethylcellulose, and polyvinyl acetate can be used.

(II) Non-Aqueous Electrolyte Secondary Battery

The non-aqueous electrolyte secondary battery has a positive electrode, a negative electrode, a non-aqueous electrolyte, and a separator. Hereafter, each constituent material will be described.

(a) Positive Electrode

The positive electrode contains the positive electrode active substance, an electroconductive material, a binder, and a collector. The positive electrode can be produced, for example, by a known method such as applying a slurry obtained by mixing the positive electrode active substance, the electroconductive material, and the binder with an organic solvent on the collector.

As the binder (binding agent), polytetrafluoroethylene, polyvinylidene fluoride, polyvinyl chloride, ethylene propylene diene polymer, styrene-butadiene rubber, acrylonitrile-butadiene rubber, fluorine-containing rubber, polyvinyl acetate, polymethyl methacrylate, polyethylene, nitrocellulose, and the like can be used.

As the electroconductive agent, acetylene black, carbon, graphite, natural graphite, artificial graphite, needle coke, and the like can be used.

As the collector, a foamed (porous) metal having continuous pores, metal formed into a honeycomb shape, a sintered metal, an expanded metal, a non-woven cloth, a plate, a foil, a perforated plate, a foil, and the like can be used.

As the organic solvent, N-methyl-2-pyrrolidone, toluene, cyclohexane, dimethylformamide, dimethylacetamide, methyl ethyl ketone, methyl acetate, methyl acrylate, diethyltriamine, N,N-dimethylaminopropylamine, ethylene oxide, tetrahydrofuran, and the like can be used.

A thickness of the positive electrode is preferably about 0.01 to 20 mm. When the thickness is too large, the electric conductivity disadvantageously decreases. When the thickness is too small, the capacity per unit area disadvantageously decreases. Here, the positive electrode obtained by application and drying may be compressed with use of a roller press in order to enhance a packing density of the positive electrode active substance.

(b) Negative Electrode

The negative electrode can be fabricated by a known method. Specifically, the negative electrode can be fabricated by a method similar to the one described in the method for fabricating the positive electrode. Namely, after a known binder and a known electroconductive material described in the method for fabricating the positive electrode are mixed with a negative electrode active substance, this mixture powder may be molded into a sheet form, and the molded body may be press-bonded onto an electroconductive net (collector) such as stainless steel or copper to obtain the negative electrode. Also, the negative electrode may be fabricated by applying a slurry obtained by mixing the aforementioned mixture powder with a known organic solvent described in the method for fabricating the positive electrode, onto a metal substrate such as copper.

As the negative electrode active substance, a known material can be used. In order to construct a high-energy-density battery, those in which an electric potential at which lithium is intercalated/deintercalated is close to a deposition/dissolution electric potential of metal lithium are preferable. A typical example thereof is a carbon material such as natural or artificial graphite having a particulate form (scale form, bulk form, fiber form, whisker form, spherical form, ground particulate form, or the like).

Examples of the artificial graphite include a graphite obtained by graphitization of mesocarbon microbeads, mesophase pitch powder, isotropic pitch powder, or the like. Also, graphite particles in which amorphous carbon is allowed to adhere to a surface thereof can be used. Among these, a natural graphite is preferable because it is inexpensive and has the electric potential close to an oxidation reduction electric potential of lithium, so that a high-energy-density battery can be constructed.

Also, a lithium transition metal oxide, lithium transition metal nitride, transition metal oxide, silicon oxide, and the like can be used as the negative electrode active substance. Among these, $Li_4Ti_5O_{12}$ is more preferable because a flatness of the electric potential is high and also the volume change by charging and discharging is small.

(c) Non-Aqueous Electrolyte

As the non-aqueous electrolyte, for example, an organic electrolytic solution, a gel-form electrolyte, a polymer solid electrolyte, an inorganic solid electrolyte, a molten salt, and the like can be used. After injecting the non-aqueous electrolyte, an opening part of a container of the secondary battery is sealed. Before sealing, energization may be carried out and a produced gas may be removed.

Examples of the organic solvent constituting the organic electrolyte include cyclic carbonates such as propylene carbonate (PC), ethylene carbonate (EC), and butylene carbonate; chain carbonates such as dimethyl carbonate (DMC), diethyl carbonate (DEC), ethyl methyl carbonate, and dipropyl carbonate; lactones such as γ-butyrolactone (GBL) and γ-valerolactone; furans such as tetrahydrofuran and 2-methyltetrahydrofuran; ethers such as diethyl ether, 1,2-dimethoxyethane, 1,2-diethoxyethane, ethoxymethoxyethane, and dioxane; dimethyl sulfoxide; sulfolane; methylsulfolane; acetonitrile; methyl formate; methyl acetate; and the like. These organic solvents may be used as a mixture of one or more kinds.

Also, cyclic carbonates such as PC, EC, and butylene carbonate are suitable as a solvent to be mixed with GBL because of having a high boiling point.

Examples of an electrolyte salt constituting the organic electrolytic solution include lithium salts such as lithium borofluoride ($LiBF_4$), lithium hexafluorophosphate ($LiPF_6$), lithium trifluoromethanesulfonate ($LiCF_3SO_3$), lithium trifluoroacetate ($LiCF_3COO$), and lithium bis(trifluoromethanesulfone)imide ($LiN(CF_3SO_2)_2$). These electrolyte salts can be used as a mixture of one or more kinds. A salt concentration of the electrolytic solution is suitably 0.5 to 3 mol/l.

(d) Separator

The separator may be, for example, a porous body, a non-woven cloth, or the like. As a material of the separator, those that do not become dissolved or swollen by the above-described organic solvent contained in the electrolyte are preferable. Specific examples thereof include polyester polymers, polyolefin polymers (for example, polyethylene, polypropylene), ether polymers, and inorganic materials such as glass.

(e) Other Members

As to the other members such as a battery container, various materials used in a conventionally known non-aqueous electrolyte secondary battery can be used without any particular limitation.

(f) Method of Producing a Non-Aqueous Electrolyte Secondary Battery

The non-aqueous electrolyte secondary battery includes, for example, a laminate body made of a positive electrode, a negative electrode, and a separator interposed therebetween. The laminate body may have, for example, a stripe-like planar shape. Also, in a case of fabricating a tubular or flat battery, the laminate may be rounded and wound.

One or a plurality of the laminate bodies are inserted into the battery container. Typically, the positive electrode and the negative electrode are connected to an external electroconductive terminal of the battery. Thereafter, the battery container is sealed so as to shield the positive electrode, the negative electrode, and the separator against an ambient air.

A method of sealing in the case of the tubular battery is typically a method of fitting a lid having a packing made of resin into an opening of the battery container and caulking the battery container and the lid. Also, in the case of a prismatic battery, a method of attaching a metallic lid called a sealed opening plate to an opening part and performing welding can be used. Besides these methods, a method of sealing with use of a binder and a method of fixing with a screw through the intermediary of a gasket can be used. Further, a method of sealing with a laminate film in which a thermoplastic resin is bonded to a metal foil can be used. Here, an opening part for injecting the electrolyte may be provided at the time of sealing.

EXAMPLES

Hereafter, the present invention will be described in more detail on the basis of Examples; however, the present invention is not limited to the following Examples. Here, for the chemical reagents used in the Examples, analytical grade reagents manufactured by Kishida Chemical Co., Ltd. were used unless specified otherwise.

Example 1

First, 40 ml of ethanol was weighed as a solvent into a sample bottle. For a starting material, 1.3196 g of $LiCH_3COO$ was weighed as a lithium source, and $Fe(NO_3)_3 \cdot 9H_2O$ as an iron source, $ZrCl_4$ as a zirconium source, $H_3PO_4$ (having a purity of 85%) as a phosphorus source, and $Si(OC_2H_5)_4$ as a silicon source were weighed so that a molar ratio thereof would be Li:Fe:Zr:P:Si=1:0.925:0.075:0.85:0.15, and they were successively dissolved into the solvent. After all the source materials were dissolved into the solvent, the mixture was stirred at room temperature for one day in a stirrer and subsequently left to stand for 24 hours in a thermostatic tank in an ambient air atmosphere of 50° C. so as to evaporate ethanol, thereby obtaining a brown powder.

To the obtained powder, 30 wt % of sucrose was added and mixed sufficiently in an agate mortar. Thereafter, the obtained mixture was pressed and formed to have a pellet shape. The obtained pellet-shaped mixture was fired at 600° C. for 12 hours in a nitrogen atmosphere, so as to obtain a sample made of $LiFe_{0.925}Zr_{0.075}P_{0.85}Si_{0.15}O_4$. The obtained sample will be referred to as A1.

The sample A1 was ground in an agate mortar, and a powder X-ray diffraction pattern shown in FIG. 1 was obtained by an X-ray analysis apparatus MiniFlex II manufactured by Rigaku Co., Ltd. A measurement condition was set to be an FT mode such that a range of 2θ would be 10° to 90° with one step being 0.02° and a measurement time per one step being 3 s.

Subsequently, the obtained powder X-ray diffraction pattern was subjected to structural analysis by Rietveld analysis using parameters shown in Table 1 as initial values by using "RIETAN-2000" (F. Izumi AND T. Ikeda, Mater. Sci. Forum, 321-324 (2000)198-203).

TABLE 1

| space group Pnma | | | | | |
|---|---|---|---|---|---|
| | A | b | | c | |
| lattice constant | 10.36 | 6.01 | | 4.7 | |
| element | site name | occupation ratio | x | y | z |
| Li | 4a | 1.000 | 0.000 | 0.000 | 0.000 |
| Fe | 4a | 0.000 | 0.000 | 0.000 | 0.000 |
| Fe | 4c | 0.875 | 0.278 | 0.250 | 0.970 |
| Zr | 4c | 0.125 | 0.278 | 0.250 | 0.970 |
| P | 4c | 0.750 | 0.101 | 0.250 | 0.423 |
| Si | 4c | 0.250 | 0.101 | 0.250 | 0.423 |
| O | 4c | 1.000 | 0.100 | 0.250 | 0.729 |
| O | 4c | 1.000 | 0.456 | 0.250 | 1.970 |
| O | 8d | 1.000 | 0.163 | 0.059 | 0.290 |

The volume of the unit lattice obtained by a result of structural analysis and the half value width of the (011) surface obtained by the powder X-ray diffraction pattern are shown in Table 2.

Example 2

First, 40 ml of ethanol was weighed as a solvent into a sample bottle. For a starting material, 1.3196 g of $LiCH_3COO$ was weighed as a lithium source, and $Fe(NO_3)_3 \cdot 9H_2O$ as an iron source, $ZrCl_4$ as a zirconium source, $H_3PO_4$ (having a purity of 85%) as a phosphorus source, and $Si(OC_2H_5)_4$ as a silicon source were weighed so that a molar ratio thereof would be Li:Fe:Zr:P:Si=1:0.9:0.1:0.8:0.2, and they were successively dissolved into the solvent. After all the source materials were dissolved into the solvent, the mixture was stirred at room temperature for one day in a stirrer and subsequently left to stand for 24 hours in a thermostatic tank in an ambient air atmosphere of 50° C. so as to evaporate ethanol, thereby obtaining a brown powder.

To the obtained powder, 30 wt % of sucrose was added and mixed sufficiently in an agate mortar. Thereafter, the obtained mixture was pressed and formed to have a pellet shape. The obtained pellet-shaped mixture was fired at 600° C. for 12 hours in a nitrogen atmosphere, so as to obtain a sample made of $LiFe_{0.9}Zr_{0.1}P_{0.8}Si_{0.2}O_4$. The obtained sample will be referred to as A2. A result of measurement of the volume of the unit lattice of A2 and the half value width of the (011) surface obtained by the powder X-ray diffraction pattern obtained in the same manner as in Example 1 is shown in Table 2.

Example 3

First, 40 ml of ethanol was weighed as a solvent into a sample bottle. For a starting material, 1.3196 g of $LiCH_3COO$ was weighed as a lithium source, and $Fe(NO_3)_3 \cdot 9H_2O$ as an iron source, $ZrCl_4$ as a zirconium source, $H_3PO_4$ (having a purity of 85%) as a phosphorus source, and $Si(OC_2H_5)_4$ as a silicon source were weighed so that a molar ratio thereof would be Li:Fe:Zr:P:Si=1:0.875:0.125:0.75:0.25, and they were successively dissolved into the solvent. After all the source materials were dissolved into the solvent, the mixture was stirred at room temperature for one day in a stirrer and subsequently left to stand for 24 hours in a thermostatic tank in an ambient air atmosphere of 50° C. so as to evaporate ethanol, thereby obtaining a brown powder.

To the obtained powder, 30 wt % of sucrose was added and mixed sufficiently in an agate mortar. Thereafter, the obtained mixture was pressed and formed to have a pellet shape. The obtained pellet-shaped mixture was fired at 600° C. for 12 hours in a nitrogen atmosphere, so as to obtain a sample made of $LiFe_{0.875}Zr_{0.125}P_{0.75}Si_{0.25}O_4$. The obtained sample will be referred to as A3. A result of measurement of the volume of the unit lattice of A3 and the half value width of the (011) surface obtained by the powder X-ray diffraction pattern obtained in the same manner as in Example 1 is shown in Table 2.

Example 4

First, 40 ml of ethanol was weighed as a solvent into a sample bottle. For a starting material, 1.3196 g of $LiCH_3COO$ was weighed as a lithium source, and $Fe(NO_3)_3.9H_2O$ as an iron source, $ZrCl_4$ as a zirconium source, $H_3PO_4$ (having a purity of 85%) as a phosphorus source, and $Si(OC_2H_5)_4$ as a silicon source were weighed so that a molar ratio thereof would be Li:Fe:Zr:P:Si=1:0.95:0.05:0.9:0.1, and they were successively dissolved into the solvent. After all the source materials were dissolved into the solvent, the mixture was stirred at room temperature for one day in a stirrer and subsequently left to stand for 24 hours in a thermostatic tank in an ambient air atmosphere of 50° C. so as to evaporate ethanol, thereby obtaining a brown powder.

To the obtained powder, 30 wt % of sucrose was added and mixed sufficiently in an agate mortar. Thereafter, the obtained mixture was pressed and formed to have a pellet shape. The obtained pellet-shaped mixture was fired at 600° C. for 12 hours in a nitrogen atmosphere, so as to obtain a sample made of $LiFe_{0.95}Zr_{0.05}P_{0.9}Si_{0.1}O_4$. The obtained sample will be referred to as A4. A result of measurement of the volume of the unit lattice of A4 and the half value width of the (011) surface obtained by the powder X-ray diffraction pattern obtained in the same manner as in Example 1 is shown in Table 2.

Comparative Example 1

First, 40 ml of ethanol was weighed as a solvent into a sample bottle. For a starting material, 1.3196 g of $LiCH_3COO$ was weighed as a lithium source, and $Fe(NO_3)_3.9H_2O$ as an iron source and $H_3PO_4$ (having a purity of 85%) as a phosphorus source were used and weighed so that a molar ratio thereof would be Li:Fe:P=1:1:1, and they were successively dissolved into the solvent. After all the source materials were dissolved into the solvent, the mixture was stirred at room temperature for one day in a stirrer and subsequently left to stand for 24 hours in a thermostatic tank in an ambient air atmosphere of 50° C. so as to evaporate ethanol, thereby obtaining a brown powder.

Figure 2:
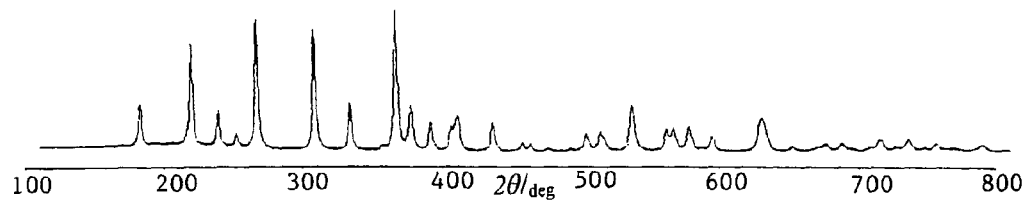
FIG. 2 is a powder X-ray diffraction pattern of the positive electrode active substance of the comparative example 1.

To the obtained powder, 30 wt % of sucrose was added and mixed sufficiently in an agate mortar. Thereafter, the obtained mixture was pressed and formed to have a pellet shape. The obtained pellet-shaped mixture was fired at 600° C. for 12 hours in a nitrogen atmosphere, so as to obtain a sample made of $LiFePO_4$. The obtained sample will be referred to as B1. The powder X-ray diffraction pattern of B1 is shown in FIG. 2. A result of measurement of the volume of the unit lattice of B1 and the half value width of the (011) surface obtained by the powder X-ray diffraction pattern obtained in the same manner as in Example 1 is shown in Table 2.

Comparative Example 2

First, 40 ml of ethanol was weighed as a solvent into a sample bottle. For a starting material, 1.3196 g of $LiCH_3COO$ was weighed as a lithium source, and $Fe(NO_3)_3.9H_2O$ as an iron source, $ZrCl_4$ as a zirconium source, $H_3PO_4$ (having a purity of 85%) as a phosphorus source, and $Si(OC_2H_5)_4$ as a silicon source were weighed so that a molar ratio thereof would be Li:Fe:Zr:P:Si=1:0.75:0.25:0.5:0.5, and they were successively dissolved into the solvent. After all the source materials were dissolved into the solvent, the mixture was stirred at room temperature for one day in a stirrer and subsequently left to stand for 24 hours in a thermostatic tank in an ambient air atmosphere of 50° C. so as to evaporate ethanol, thereby obtaining a brown powder.

To the obtained powder, 30 wt % of sucrose was added and mixed sufficiently in an agate mortar. Thereafter, the obtained mixture was pressed and formed to have a pellet shape. The obtained pellet-shaped mixture was fired at 600° C. for 12 hours in a nitrogen atmosphere, so as to obtain a sample made of $LiFe_{0.75}Zr_{0.25}P_{0.5}Si_{0.5}O_4$. The obtained sample will be referred to as B2.

TABLE 2

|    | half value width (°) | a (Å) | b (Å) | c (Å) | volume of unit lattice (Å³) |
|----|---|---|---|---|---|
| A1 | 0.320 | 10.335 | 6.005 | 4.701 | 291.79 |
| A2 | 0.380 | 10.343 | 6.010 | 4.706 | 292.54 |
| A3 | 0.320 | 10.355 | 6.020 | 4.712 | 293.75 |
| A4 | 0.300 | 10.332 | 6.005 | 4.699 | 291.42 |
| B1 | 0.260 | 10.328 | 6.007 | 4.696 | 291.34 |
| B2 | single phase had not been obtained |||||

(measurement of volume change ratio)

With respect to each sample, a cell for measurement of the volume change ratio was fabricated by the following method.

About 1 g of each of A1 to A4 and B1 (B2 was not measured because a single phase had not been obtained) was weighed and ground in an agate mortar. With this, about 10 wt % of acetylene black (Denka Black manufactured by Denki kagaku kogyo K.K.) as an electroconductive material and about 10 wt % of fluororesin powder (KF Polymer manufactured by Kureha Co., Ltd.) as a binder were mixed.

This mixture was dissolved into N-methyl-2-pyrrolidone and made into a slurry form. This was applied onto both surfaces of an aluminum foil having a thickness of 20 μm by the doctor blade method. The application amount was set to be about 5 mg/cm². After this coating film was dried, the foil was cut so that an electrode application surface would be 2 cm×2 cm, followed by pressing to obtain a positive electrode.

Into a beaker of 50 ml, about 30 ml of an electrolyte made of 50 vol % of ethylene carbonate into which 1 mol/liter of $LiPF_6$ had been dissolved and 50 vol % of diethyl carbonate was injected. Into the electrolyte, the positive electrode and a metal lithium serving as a negative electrode active substance as a counterelectrode were immersed to obtain a cell.

Initial charging of the cell obtained in an environment of 25° C. was carried out. A charging current was set to be 0.1 mA, and the charging was ended at a time point at which the electric potential of the cell reached 4V. After the charging was ended, discharging was carried out at 0.1 mA, and the discharging was ended at a time point at which the electric potential of the cell reached 2.0V.

The cell was further charged up to 4V with an electric current of 0.1 mA, so as to obtain a state of lithium deintercalation. The positive electrode in this state was taken out, and the powder X-ray diffraction measurement using a CuKα beam was carried out so as to determine lattice constants (a-axis, b-axis, and c-axis) of the positive electrode active substance before and after the lithium deintercalation.

By obtaining a product of the a-axis, the b-axis, and the c-axis, a lattice volume before and after the lithium deintercalation was calculated, and the volume change ratio was calculated by a formula of volume change ratio=(A—B)×100/A (A means the crystal lattice volume before the lithium deintercalation and B means the crystal lattice volume after the lithium deintercalation).

The lattice constants, the lattice volume, and the volume change ratio before and after charging are shown in Table 3. Also, in a similar cell, the discharging capacity at the 100th time was measured, and the capacity retaining ratio was determined by the following formula. A result thereof is shown in Table 3.

Capacity retaining ratio=(discharging capacity at the 100th time)/(initial discharging capacity)

TABLE 3

| sample name | volume change ratio | capacity retaining ratio at the 100th time |
|---|---|---|
| A1 | 4.4% | 96.2% |
| A2 | 4.2% | 99.0% |
| A3 | 3.7% | 97.5% |
| A4 | 4.9% | 95.7% |
| B1 | 6.3% | 81.0% |

From Table 3, it will be understood that a positive electrode active substance having a structure of the above general formula (1) and having a half value width of the diffraction peak of the (011) surface of 0.30° or more has a small volume change ratio and can improve the capacity maintaining ratio of the battery containing the same.

In the present invention, since the half value width of the diffraction peak of the lattice surface (011) surface of the unit lattice constituting the lithium-containing metal oxide which is the positive electrode active substance is 0.30° or more, and also the volume of the unit lattice is 291.4 Å³ or more or 291.0 Å³ or less, the volume change of the positive electrode active substance can be restrained. As a result of this, the capacity deterioration caused by repetition of the charging and discharging cycles can be restrained both at an ordinary temperature and at a high temperature. Also, a positive electrode and a non-aqueous electrolyte secondary battery that can restrain the capacity deterioration can be provided.

When the unit lattice has a volume change ratio of 5.5% or less between at the time of Li intercalation and at the time of Li deintercalation, the capacity deterioration caused by repetition of the charging and discharging cycles can be further more restrained. When M is Zr, the capacity deterioration caused by repetition of the charging and discharging cycles can be further more restrained.

When x is in a range of 0<x<0.2, the capacity deterioration caused by repetition of the charging and discharging cycles can be further more restrained.

When x and y satisfy a relationship of 2x=y, the capacity deterioration caused by repetition of the charging and discharging cycles can be further more restrained.

What is claimed is:

1. A positive electrode active substance comprising a lithium-containing metal oxide
represented by the following general formula (1):

$$\text{LiFe}_{1-x}\text{M}_x\text{P}_{1-y}\text{Si}_y\text{O}_4 \qquad (1)$$

wherein M is an element selected from Sn, Zr, Y, and Al; 0<x<1; and 0<y<1,
having one volume of a unit lattice included in a range of 291.4 to 300.0 Å³ or in a range of 285.0 to 291.0 Å³, and
having a half value width of a diffraction peak of a (011) surface of 0.30° or more.

2. The positive electrode active substance of claim 1, wherein the unit lattice has a volume change ratio of 5.5% or less between at the time of Li intercalation and at the time of Li deintercalation.

3. The positive electrode active substance of claim 1, wherein the M is Zr.

4. The positive electrode active substance of claim 1, wherein the x is in a range of 0<x≤0.2.

5. The positive electrode active substance of claim 1, wherein the y is in a range of 0<y≤0.4.

6. A positive electrode comprising the positive electrode active substance of claim 1, an electroconductive material, and a binder.

7. A non-aqueous electrolyte secondary battery comprising the positive electrode of claim 6 containing the positive electrode active substance, a negative electrode, an electrolyte, and a separator.

8. A positive electrode active substance comprising a lithium-containing metal oxide
represented by the following general formula (1):

$$\text{LiFe}_{1-x}\text{M}_x\text{P}_{1-y}\text{Si}_y\text{O}_4 \qquad (1)$$

wherein M represents Zr or Y; 0<x<1; and 0<y<1,
having one volume of a unit lattice included in a range of 291.4 to 300.0 Å³ or in a range of 285.0 to 291.0 Å³, and
having a half value width of a diffraction peak of a (011) surface of 0.30° or more.

9. A positive electrode active substance comprising a lithium-containing metal oxide
represented by the following general formula (1):

$$\text{LiFe}_{1-x}\text{M}_x\text{P}_{1-y}\text{Si}_y\text{O}_4 \qquad (1)$$

wherein M represents a metal element having a single valence number; 0<x<1; and 0<y<1,
having one volume of a unit lattice included in a range of 291.4 to 300.0 Å³ or in a range of 285.0 to 291.0 Å³, and
having a half value width of a diffraction peak of a (011) surface of 0.30° or more.

* * * * *